UNITED STATES PATENT OFFICE.

ALFRED TAYLOR SNODGRASS, OF MANCHESTER, ENGLAND.

MANUFACTURE OF ARTIFICIAL ABRASIVES.

1,314,835.　　Specification of Letters Patent.　Patented Sept. 2, 1919.

No Drawing.　　Application filed June 22, 1918.　Serial No. 241,449.

*To all whom it may concern:*

Be it known that I, ALFRED TAYLOR SNODGRASS, a subject of the King of Great Britain, residing at 716 Chester road, Stretford, Manchester, in the county of Lancaster, England, have invented new and useful Improvements in the Manufacture of Artificial Abrasives, of which the following is a specification.

My invention relates to improvements in the manufacture of artificial abrasives employed for making grinding wheels, abrasive cloth and paper, and for a variety of other purposes in the arts and manufactures.

Carborundum (silicon carbid), artificial corundum and like abrasive materials have been produced regularly during the past twenty five years or more in several foreign countries by the reduction to a molten mass of a mixture of various materials in the electric arc.

To the best of my knowledge the various known processes in use in the manufacture of these artificial abrasives necessitate the use of the electric arc in order to produce a sufficiently high temperature to melt the materials employed and for this reason the manufacture can only be carried on as a commercial proposition in districts (such as Niagara) where electric power can be produced at a reasonable cost.

The principal materials used in the manufacture of the carborundum group consist so far as I am aware of pure white sand, carbon and sodium chlorid—the sodium chlorid apparently being intended to act as a flux. Artificial corundum has been produced from aluminium dust, from "bauxite" and from powdered emery mixed with carbon to eliminate the ferric oxid of the emery.

My invention has for its object the production of an artificial abrasive or group of abrasives by a simple, economical and commercial process.

The raw material, or materials suitable for the purpose in view, must in the first place contain a high percentage of "alumina" (*i. e.* aluminium oxid) and must also be of low technical or commercial value in order that the ultimate cost shall be as low as possible.

The following list comprises substances as suitable raw materials which conform to the above conditions:—

Natural emery, natural corundum, and like abrasives, the finely powdered forms of which constitute a more or less waste product from emery and glass grinding mills. Also native "bauxite" (an impure form of aluminium oxid) can be used as a raw material or any like substances containing a high percentage of alumina.

An analysis of natural emery (the most important of natural abrasives) from the "Naxos" mines gives the following result:—

| | |
|---|---|
| Alumina | 57.69 |
| Ferric oxid | 30.87 |
| Silica | 6.36 |
| Lime, magnesia, water of crystallization and impurities | 5.08 |
| | 100.00 |

From this analysis it appeared likely that the introduction of a limited further quantity of silica would not affect the abrasive properties of the material it was desired to produce, and potassium and sodium silicates being cheap and readily obtainable, were considered as being suitable materials to act as a "flux".

Now, ordinary "bottle" glass contains nearly sixty per cent. of potassium or sodium silicate—the principal remaining ingredients being ferric oxid, alumina and lime.

Large quantities of broken glass known commercially as "cullet" are now crushed or ground and sieved, the larger particles being employed in the manufacture of glass paper and the remaining powder, known as "flour" glass, is practically a waste product.

I therefore selected and adopted such flour glass as a cheap flux containing a large percentage of either or both of the silicates proposed.

In carrying my invention into effect I take a quantity of any one or more of the raw materials previously indicated as suitable for my purpose, say for example, "flour" emery which is the final sieved residue of natural emery reduced to a powder by crushing and mix it intimately with "flour" glass which is the sieved residue of crushed glass in the proportion of say from two to three parts of emery to one part of "flour" glass and this mixture is molded, for convenience into round balls and placed in a plumbago crucible or other suitable receptacle. This crucible or receptacle is heated preferably in an ordinary standard type of modern gas furnace as used for melting metals at high temperatures in which it is subjected to a temperature of not less than 1700° C.

At or about this temperature the contents of the receptacle become molten through the agency of the "flour" glass as a flux and at this stage the molten liquid is poured on to a cool surface or otherwise allowed to solidify.

The product, when cold, consists of an extremely hard mass which when crushed and graded is eminently suitable for use as raw material, in the manufacture of abrasive cloth or paper, grinding wheels, and various other articles or for all the purposes in the art and manufactures to which natural and artificial abrasives can be put.

By my invention I am enabled—

1. To produce an abrasive, or group of abrasives, the nature and composition of which will depend largely upon the varying characteristics of the raw material used in its production and which, after crushing and grading can be used for all or any of the purposes for which natural or artificial abrasives are used.

2. To utilize as the preferred raw material "flour" emery which has hitherto been treated as a practically waste product, of which but little use has been made for manufacturing and industrial purposes.

3. To have selected and adopted another practically waste material namely "flour" glass as a cheap and effective flux whereby the raw materials used in the production of these abrasives can be reduced more readily to the molten state.

What I claim as my invention and desire to secure by Letters Patent is:—

In the manufacture of artificial abrasives the use and application of a mixture of "flour" emery as a specific raw material, "flour" glass as a specific flux, and reducing the said mixture to a molten mass by the application of heat at a temperature of not less than 1700° C. and then allowing the mixture to cool.

ALFRED TAYLOR SNODGRASS.

Witnesses:
S. W. GILLETT,
HERBERT ROWLAND ABBEY.